United States Patent [19]

Densham et al.

[11] Patent Number: 5,132,871
[45] Date of Patent: Jul. 21, 1992

[54] BATTERY POWERED DISK DRIVE SYSTEM HAVING A SMART CONNECTOR FOR A PORTABLE COMPUTER

[75] Inventors: William L. Densham, Los Gatos; John W. Zolkos, Union City, both of Calif.

[73] Assignee: Poqet Computer Corporation, Santa Clara, Calif.

[21] Appl. No.: 405,697

[22] Filed: Sep. 11, 1989

[51] Int. Cl.$^5$ .......................... H05K 1/00; H01R 9/03; G06F 1/00
[52] U.S. Cl. .................................. 361/380; 361/395; 361/399; 439/76
[58] Field of Search .................. 439/59, 76, 77, 67, 439/502, 638; 361/380, 390, 391, 392, 393, 394, 395, 399; 360/97.01, 97.02, 97.03, 97.04, 137

[56] References Cited

U.S. PATENT DOCUMENTS

| | | | |
|---|---|---|---|
| 4,908,793 | 3/1990 | Yamagata et al. | 360/97.01 X |
| 5,026,293 | 6/1991 | Wilson | 439/76 |

OTHER PUBLICATIONS

IBM Technical Disclosure, vol. 33, No. 9, Feb. 1991, pp. 230-232, "Smart Cable Enclosure/Connector".

Primary Examiner—Leo P. Picard
Assistant Examiner—Michael W. Phillips
Attorney, Agent, or Firm—Skjerven, Morrill, MacPherson, Franklin & Friel

[57] ABSTRACT

A battery powered disk drive system for a portable computer comprises a disk drive unit, a cable, and a smart connector. The smart connector includes a disk drive controller integrated circuit, a printed circuit board, and an exterior plastic molding. The exterior plastic molding has an upper edge portion which butts against a display section of the portable computer when in use. Since the disk controller is physically located on the outside of a housing of the portable computer, the size of the portable computer is minimized. High frequency signals are converted to low frequency signals by the disk controller and, since the smart connector is located physically close to the computer, electromagnetic interference is minimized.

5 Claims, 7 Drawing Sheets

BATTERY POWERED DISK DRIVE SYSTEM HAVING A SMART CONNECTOR FOR A PORTABLE COMPUTER

BACKGROUND OF THE INVENTION

1. Field of the Invention

This invention relates to computer systems and more specifically to a battery powered disk drive system connectable to a portable computer.

2. Description of the Prior Art

Many different portable computer systems are available today, most of which comprise the fundamental components as illustrated in FIG. 1. These components include a central processing unit (CPU) 10 which is connected through an input bus 11 to an input module 12 (such as a keyboard), and through an output bus 13 to an output module 14 (typically a display screen). The CPU 10 is also connected through data buses 15 and 16 to at least one memory unit 17.

Memory unit 17 typically stores both computer programs and data. Data in memory unit 17 is processed by CPU 10 in response to the instructions from a computer program being executed in CPU 10.

Memory unit 17 typically includes mass memory 17A, sometimes called secondary memory, and main memory 17B. Main memory 17B is a relatively fast memory. A typical access time is in the range from 20 to approximately 400 nanoseconds. Access time is the time interval between when CPU 10 requests data from memory 17 and when memory 17 makes the requested data available to CPU 10.

Mass memory 17A is usually used to store programs not being executed and data not being accessed and, because of size limitations of main memory 17B, is also frequently used to store at least a portion of the program currently being executed by CPU 10 and data required by this program. Mass memory 17A is significantly slower than main memory 17B. Access time for mass memory is typically on the order of tens of milliseconds.

A computer system which can be connected to a disk drive typically utilizes a disk drive controller chip which receives data, addressing, and other control lines from the microprocessor and coordinates data transfers to and from the disk drive. The disk controller typically performs a number of functions, including automatic verification, format compatibility, read or write with simple or multiple blocks, automatic sector search, complete track read or write, and simultaneous control of several disk drives.

The disk controller chip is mounted within the housing of a typical portable computer which also encloses the microprocessor, memory, and support circuitry. The disk controller may be connected to a cable which extends out of the computer housing to a disk drive if the disk drive is not included within the computer housing.

With the increasing use of computers in modern-day society, there has developed a demand for battery powered computers which can be transported from location to location without burden and which can be operated in virtually any location However, most battery powered computers available today have several limitations. Primary limitations include lack of computing power and memory space. Most battery powered computers are not capable of running the same programs as can be run on popular, modern, desk top PCs, such as the IBM PC/XT. The inability of battery powered computers to run the same programs as their contemporary desk-top counterparts has resulted in slow acceptance and minimal use of battery powered computers.

A few battery powered computers have been developed which use the same microprocessors and have the same memory capacity as popular desk top PCs. Many of these battery powered computers, however, have extremely short battery lives and require specialized battery packs. In addition, they are relatively large and some do not provide convenient connection to external disk drives.

SUMMARY OF THE INVENTION

The battery powered disk drive system according to the present invention comprises a disk drive unit powered by batteries, a cable connectable to the disk drive unit, and a smart connector which is removably attachable to a battery powered computer. The smart connector includes a disk controller integrated circuit chip mounted on a printed circuit board which is contained within an exterior molding. The smart connector plugs into a port externally accessible to the portable computer and includes means located physically close to the computer for receiving high frequency continuous and non-continuous signals from the computer and in response generating lower frequency signals which are transmitted by the cable, which may have considerable length, to the disk drive unit.

Since the disk controller chip is mounted within the smart connector rather than within the housing of the portable computer, the size of the portable computer can be minimized. Furthermore, since the smart connector including the disk controller chip is located physically close to the computer housing, the relatively high frequency signals generated by the computer in synchronization with the computer clock are converted to lower frequency disk controller signals before transmission along the relatively long cable connecting to the disk drive unit. Hence, EMR (electromagnetic radiation) interference is minimized.

Further, since the smart connector, including the disk controller chip, is removably connected to the computer, the capacitance of the controller chip is only applied to the computer circuitry when the smart connector is plugged in. Since the power to the controller chip is supplied by the disk drive batteries, the power to drive the controller chip does not have to be provided by the computer batteries.

In one embodiment, the physical design of the exterior molding of the smart connector allows unobstructed positioning of a display screen of the portable computer. When the display screen is positioned at a maximum radially open position, the rear of the display screen butts against a sloping upper portion of the exterior molding. Furthermore, footings on the bottom of the exterior molding relieve torque pressure at a connector portion of a printed circuit board which extends through an opening in the smart connector molding to plug into the computer. This thereby prevents mechanical damage and assures uniform and durable electrical connections.

DETAILED DESCRIPTION OF THE DRAWINGS

Figure 1:
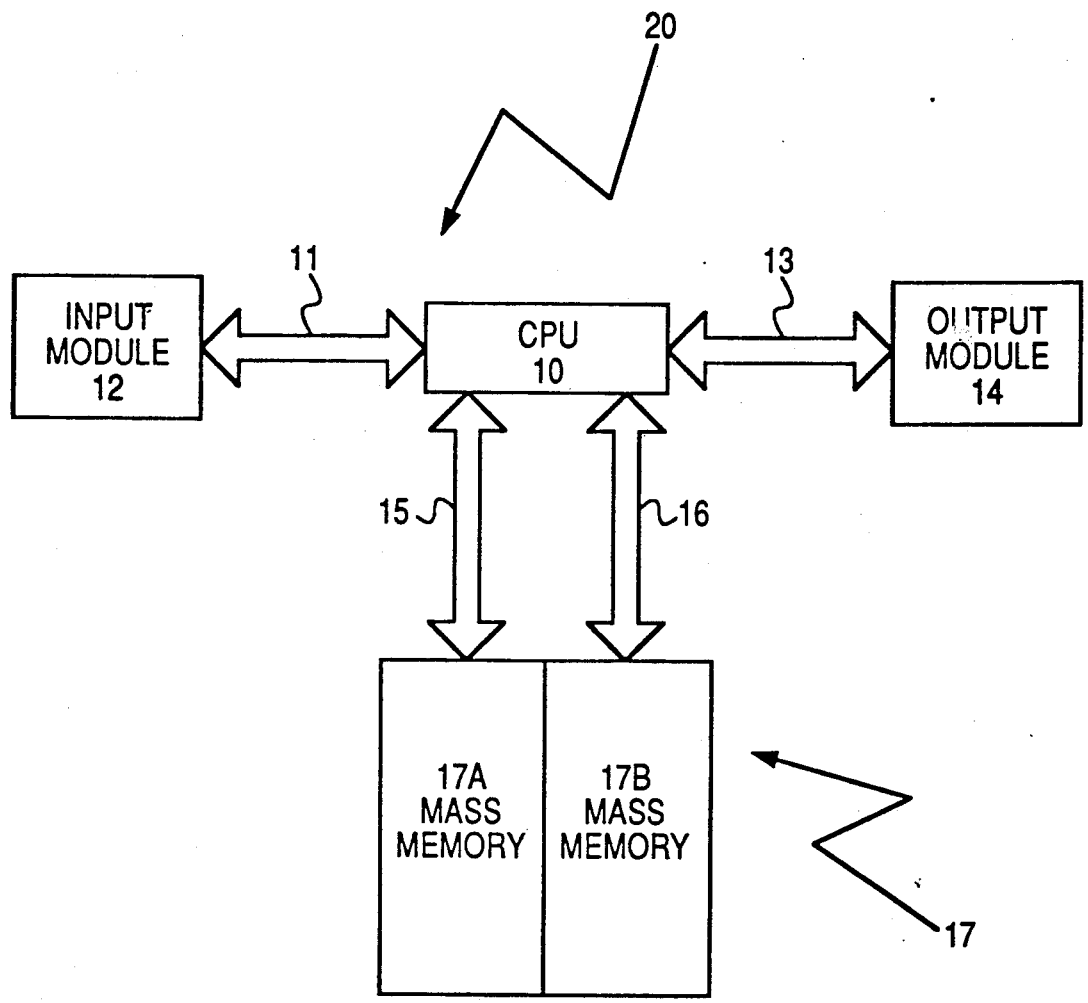
FIG. 1 shows a block diagram of a basic computer system.
Figure 2:
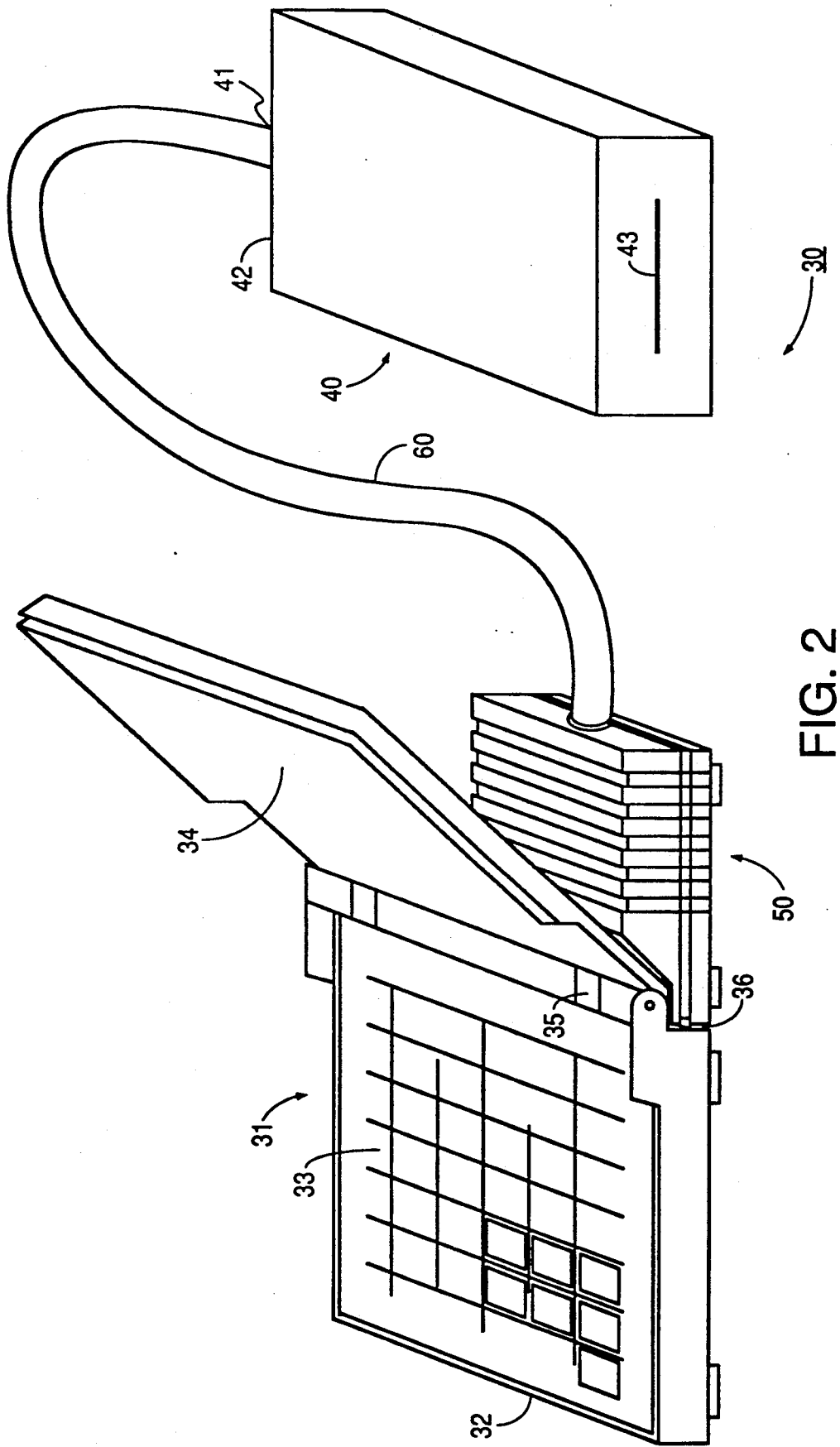
FIG. 2 shows a battery powered disk drive system connected to a battery powered computer.

Referring to FIG. 2, there is shown a battery powered disk drive system 30 connected to a portable computer 31. A central processing unit, fast memory, and other computer circuitry are contained within a housing 32 of portable computer 31. Portable computer 31 has a keyboard section 33 and a display section 34. Keyboard section 33 and display section 34 are connected by hinges 35 such that display section 34 can be folded against keyboard section 33 when the computer is not in use. An eighty-pin communications port 36 (also shown in FIG. 4D) is located at the rear of portable computer 31 and makes address, data, and other control lines of portable computer 31 available to be connected to external devices. In one embodiment of the invention, disk drive system 30 is utilized in conjunction with a low power portable computer which is described in a co-pending, commonly assigned application of John P. Fairbanks et al., entitled "Portable Low Power Computer", U.S. Ser. No. 07/375,721, which is incorporated herein by reference.

Figure 5:
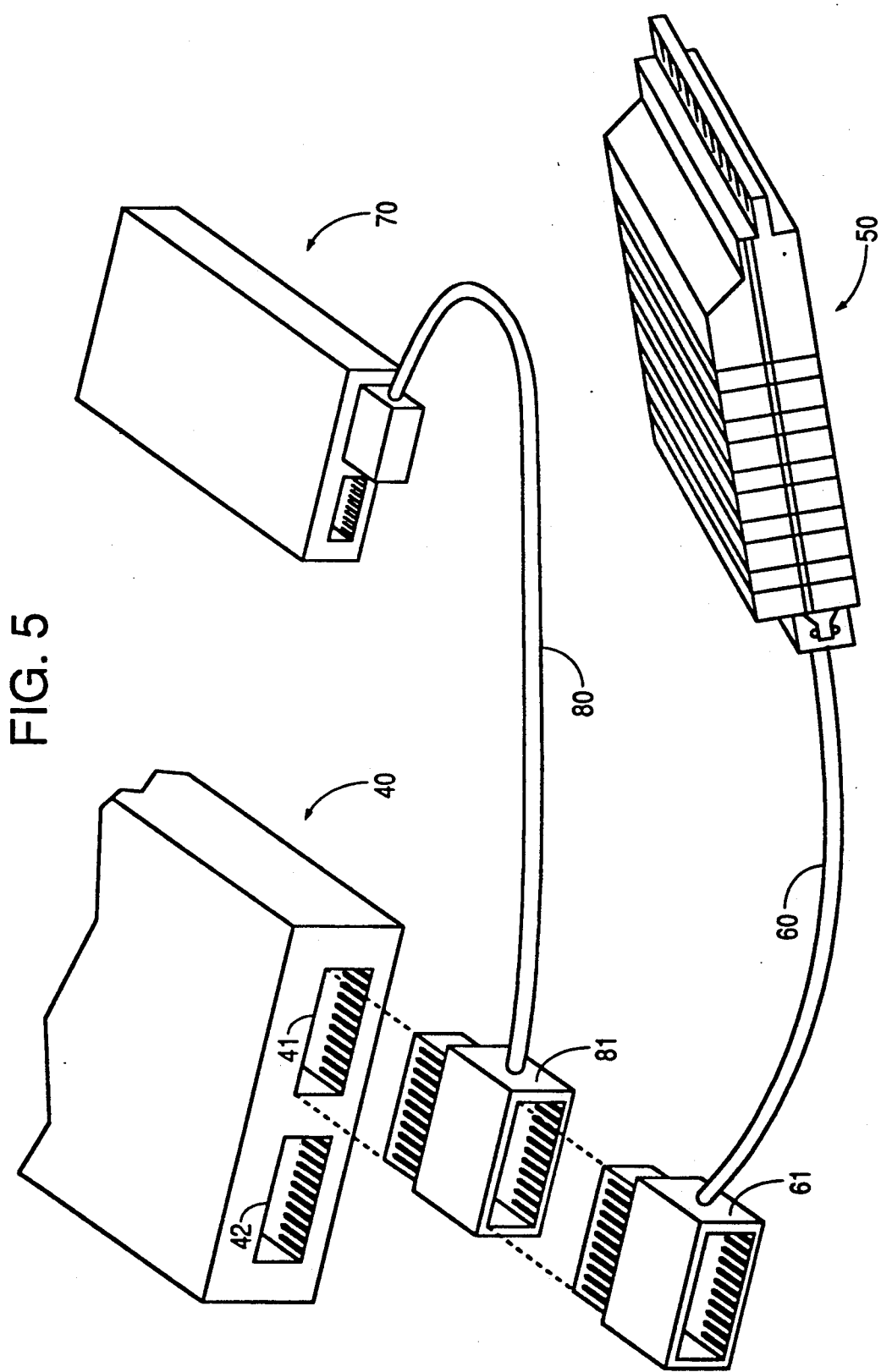
FIG. 5 shows a second disk drive unit connected by a cable which interconnects to the smart connector.

A disk drive unit 40 allows data to be transferred to and from memory storage disks (not shown) and portable computer 31. Disk drive unit 40 is powered by a battery pack comprising four AA batteries (in one preferred embodiment) which supplies a power supply having an output voltage of approximately five volts. As shown in FIG. 5, a drive controller port 41 for receiving a twenty-five pin connector is located at the exterior rear of disk drive unit 40. A serial RS-232 port 42 (see FIG. 5) is further provided at the exterior rear of disk drive unit 40. This RS-232 port 42 allows additional computer peripherals, such as a printer, plotter, or modem to be connected to the computer 31. Referring again to FIG. 2, a slot 43 in disk drive unit 40 receives a removable storage disk (not shown).

A smart connector 50 and cable 60 provide a communication link between portable computer 31 and disk drive unit 40. Cable 60 extends from the twenty-five pin drive controller port 41 at the rear of disk drive unit 40. The term "smart connector" is used to emphasize that smart connector 50 provides processing and control functions for supporting communication between disk drive unit 40 and portable computer 31, rather than simply providing an electrical connection between portable computer 31 and disk drive unit 40.

Smart connector 50 is connectable to communications port 36 of portable computer 31. Smart connector 50 includes a disk drive controller integrated circuit chip which is preferably mounted on a printed circuit board. The disk controller provides a number of common functions, including automatic verification, format compatibility, read or write with simple or multiple blocks, automatic sector search, complete track read or write, and simultaneous control of several disk drives. Disk controllers have been available for some time, and their operation within a computer system is known. The disk controller used in one preferred embodiment of the present invention is manufactured by ACC Microelectronics Corporation as part number ACC3201.

Figure 3A:
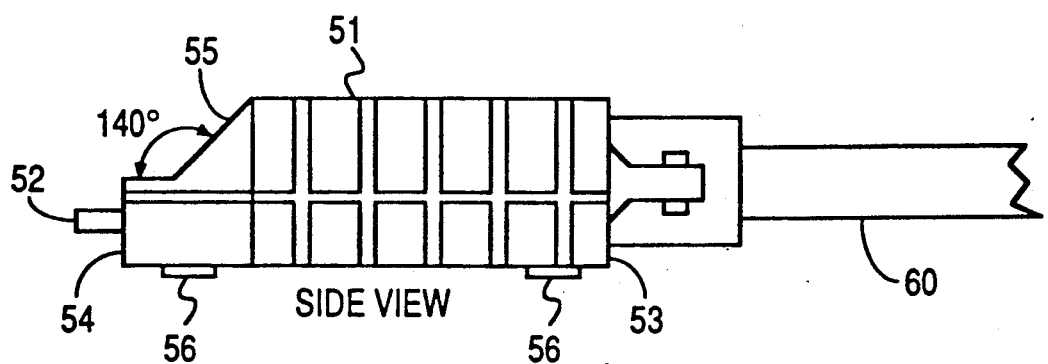
FIG. 3A shows a side view of the smart connector and cable.

FIG. 3A shows a side view of a preferred embodiment of smart connector 50 and cable 60. An exterior molding 51, preferably made of plastic, houses the disk controller integrated circuit chip. Cable 60 is also connected to the printed circuit board within the exterior molding. An extending connector portion 52 of the printed circuit board has eighty terminals and is adapted for connecting to the mating eighty-pin communications port 36 of portable computer 31. Cable 60 extends from an opposite end 53 of exterior molding 51 from connector portion 52.

The printed circuit board is entirely surrounded by exterior molding 51 except at extending connector portion 52. A lower edge portion 54 of exterior molding 51 is formed beneath extending connector portion 52 and extends to the bottom of exterior molding 51 at an angle approximately perpendicular to the outwardly extending direction of connector portion 52. An upper edge portion 55 extends to the top of exterior molding 51 with a sloping angle of approximately 140 degrees with respect to the outwardly extending direction of the connector portion 52. In one embodiment, footings 56 are positioned along the bottom of exterior molding 51 in order to support exterior molding 51 on a common flat surface with computer 31 and thereby minimize torsional forces on connector portion 52. Alternatively, molding 51 may be sized such that the lower extent of molding 51 is coplanar with the lower extent of computer 31. Smart connector 50 is thus physically designed to prevent mechanical damage and to assure uniform and durable electrical connections.

Figure 3B:
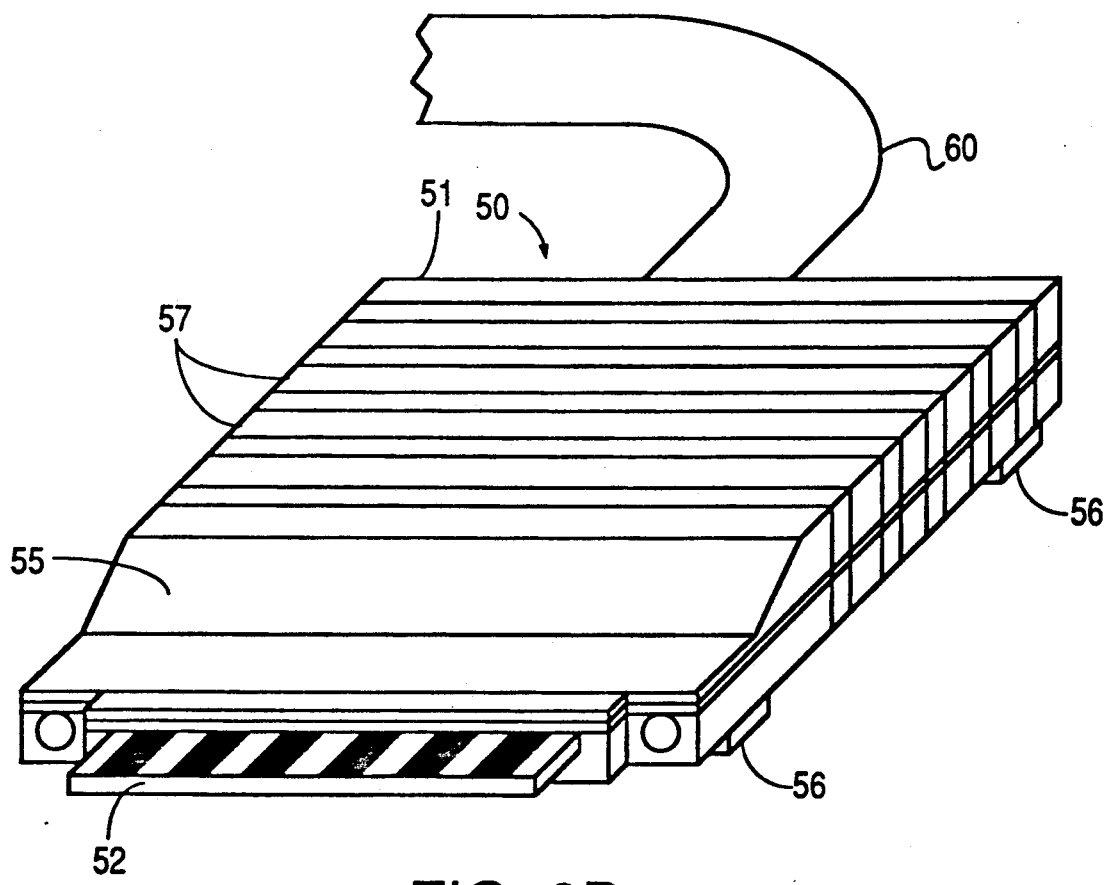
FIG. 3B shows a perspective view of the smart connector and cable.

FIG. 3B shows a perspective view of smart connector 50. In one embodiment, grooves 57 are formed along the outer surface of exterior molding 51, in order to assist the user in inserting and removing smart connector 50 from port 36 of computer 31.

Figure 4A:
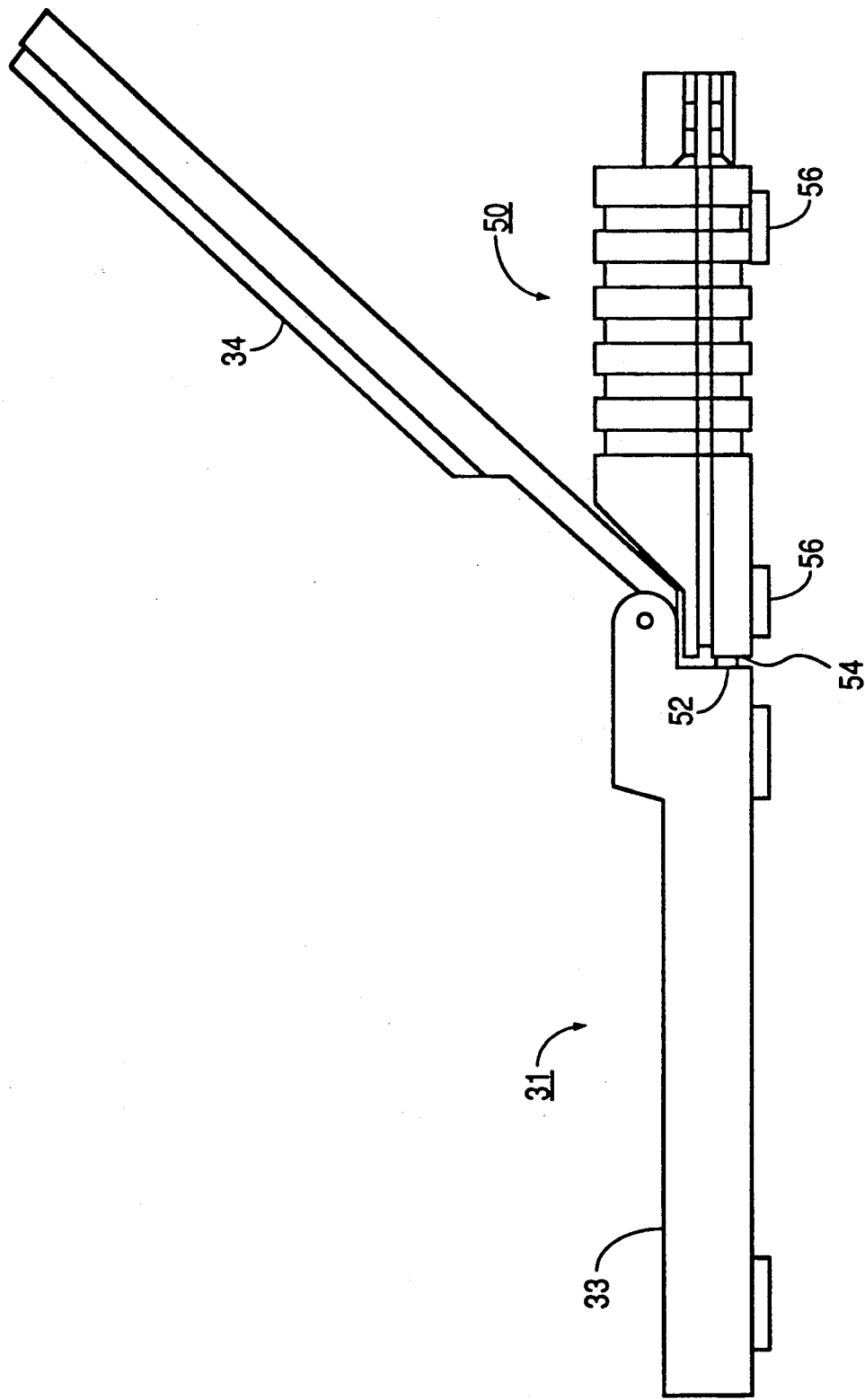
FIG. 4A shows a side view of the smart connector attached to the portable computer.

FIG. 4A shows an outer view of smart connector 50 while attached to a portable computer 31 having a keyboard section 33 and a display section 34. Keyboard section 33 and display section 34 are connected by hinges such that display section 34 can be rotated to close against the keyboard section 33 when the computer is not in use, as shown in FIG. 4B, or opened for use as shown in FIG. 4A.

Figure 4B:
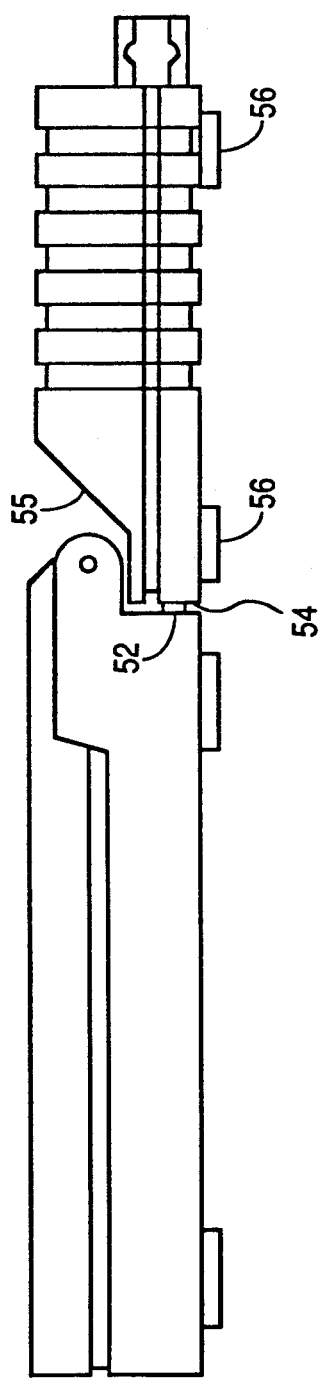
FIG. 4B shows a side view of the portable computer and the smart connector when the display section is positioned adjacent the keyboard section.

As shown in FIGS. 4A and 4B, lower edge portion 54 butts against the back edge of keyboard section 33. Sloping upper edge portion 55 allows display section 34 to be opened at an angle beyond 90 degrees with respect to keyboard section 33. At a given maximum angle, with computer 31 preferably opened 140° from its closed position, a portion of display section 34 butts against upper edge portion 55 as shown in FIG. 4A. The physical design of smart connector 50 therefore allows for unobstructed positioning of display section 34.

Figure 4C:
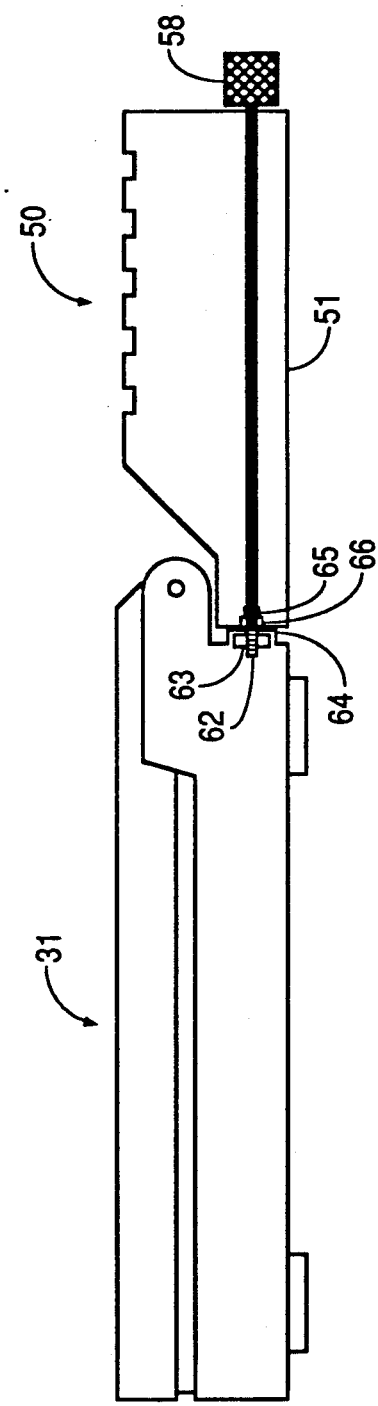
FIG. 4C shows a cross section of the smart connector and illustrates attachment to the portable computer by thumb screws.
Figure 4D:
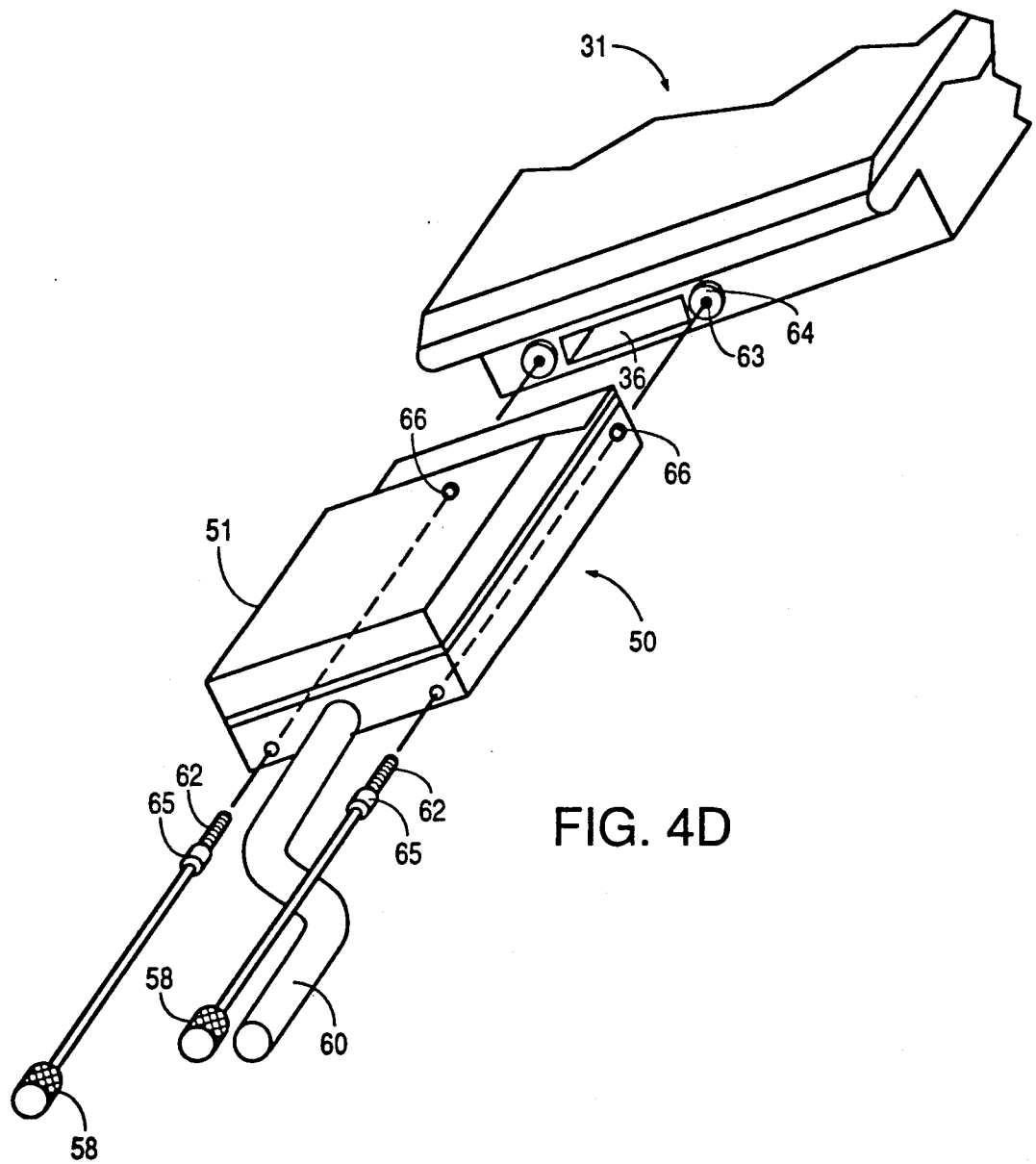
FIG. 4D shows a perspective view of the smart connector attachable to the portable computer by thumb screws.

In one embodiment as shown in FIGS. 4C and 4D, a pair of thumb screws 58, one on each side of cable 60, are provided which extend through an interior portion of smart connector 50. A threaded portion 62 of each thumb screw 58 may be secured into a corresponding threaded insert section 63. Each insert section 63 is surrounded by a molded boss 64 formed near communications port 36 of portable computer 31. A shoulder section 65 of each thumb screw 58 exerts pressure against a pair of corresponding channel portions 66, formed on an inner section of exterior molding 51, when thumb screws 68 are tightened to secure smart connector 50 to portable computer 31. Consequently, torsional stress is applied to each boss 64 rather than to connector portion 52 of the printed circuit board.

As shown in FIG. 5, more than one disk drive unit can be connected to the portable computer through smart connector 50. A second battery operated disk drive unit 70, identical to disk drive unit 40, is connected through a cable 80. Cable 80 has a connector 81 with corresponding twenty-five pin male and female sections. As such, the connector 81 may be attached at drive controller port 41 of disk drive unit 40. A connector 61, connected to an end of cable 60 opposite to smart connector 50, correspondingly mates to the rear female section of connector 81. The selection between disk drive unit 40 and disk drive unit 70 is controlled by the disk drive controller chip of smart connector 50. As a result of this arrangement for connecting second disk drive unit 70, additional communication ports are not required at the exterior of the portable computer or disk drive unit 40, thereby further minimizing the overall size requirements of the portable computer and disk drive units.

Variations from the embodiments discussed here will become obvious to those skilled in the art in light of the above disclosure and are intended to fall within the scope of the present invention.

We claim:

1. A battery powered disk drive system for a portable computer, said disk drive system comprising:
   a disk drive unit powered by at least one battery for transferring data between a disk and said portable computer;
   a cable connectable to said disk drive unit; and
   a smart connector connected to said cable and removably connectable to said portable computer, said smart connector having an external molding and a disk controller integrated circuit, said disk controller integrated circuit being enclosed by said exterior molding and having means for converting high frequency signals compatible with said portable computer to and from lower frequency signals which are transmitted to and received from said disk drive unit.

2. A battery powered disk drive system as recited in claim 1 wherein said smart connector further comprises a printed circuit board, said disk controller integrated circuit being mounted and electrically connected to said printed circuit board, said cable being electrically connected to said printed circuit board.

3. A battery powered disk drive system as in claim 2 in which said printed circuit board has a connector portion adapted to be connected to said portable computer, and said exterior molding surrounds said printed circuit board except at said connector portion.

4. A battery powered disk drive system as recited in claim 2 wherein said exterior molding of said smart connector has a lower extent coplanar with a lower extent of said portable computer. smart connector is removably connected to said portable computer.

5. A battery powered disk drive system as in claim 3 in which said exterior molding of said smart connector has an upper portion with a sloping angle of approximately 140 degrees with respect to the outwardly extending direction of said connector portion.

* * * * *

UNITED STATES PATENT AND TRADEMARK OFFICE
CERTIFICATE OF CORRECTION

PATENT NO. : 5,132,871
DATED : July 21, 1992
INVENTOR(S) : Densham et al.

It is certified that error appears in the above-identified patent and that said Letters Patent is hereby corrected as shown below:

Col. 6, line 32 (Claim 4), delete "computer." and insert --computer when said--

Signed and Sealed this

Fifth Day of October, 1993

BRUCE LEHMAN

Attest:

Attesting Officer

Commissioner of Patents and Trademarks